Patented May 28, 1940

2,202,385

UNITED STATES PATENT OFFICE 2,202,385

METHOD FOR DETERMINING THE CHARACTER OF COFFEE

William Redmond Johnston, Bronx, N. Y., assignor to Standard Brands Incorporated, New York, N. Y., a corporation of Delaware No Drawing. Application May 18, 1938, Serial No. 208,602

5 Claims. (Cl. 23—230)

The invention relates to a method for ascertainment of deterioration in roasted coffee. More particularly, it is concerned with a procedure for determining the extent of staling in roasted coffee, and includes correlated improvements and discoveries whereby such determination may be effected.

It has been suggested that staling of coffee, or flavor deterioration which occurs on exposure to air, is due to absorption of oxygen by the coffee and reaction of the absorbed oxygen with flavor constituents. Although it is believed that the flavor of coffee is occasioned by a rather complex mixture of compounds, nevertheless I have found that the rate of absorption of oxygen by flavor constituents of coffee constitutes a measure of their concentration, and hence a measure of the freshness of roasted coffee.

The amount of flavor imparting substances in coffee is small, and in view thereof I utilize a micro method to ascertain the oxidation of coffee by molecular oxygen, and have learned that the Barcroft-Warburg (described by Dixon in "Manometric Methods" published by Cambridge, England, University Press, 1934) manometer technique is well adapted for measuring the amount of oxygen absorbed.

It is an object of the invention to provide a method in accordance with which the amount of change that has taken place in a roasted coffee may be determined with accuracy.

Another object of the invention is to provide a method whereby the extent of staling in roasted coffee may be readily, economically and effectively ascertained.

A further object of the invention is to provide a method for determining the nature, character and manner of roasting of a coffee.

A more particular object of the invention is the provision of a method for arriving at the oxidizability of constituents of a roasted coffee whereby the desirability of such coffee for beverage purposes is indicated.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention the loss in freshness, if any, or change in flavor imparting constituents in roasted coffee may be measured by ascertaining the oxidation undergone by the coffee through a contacting thereof with oxygen and determination of the amount of oxygen absorbed. This determination may be carried out effectively by preparing an infusion of roasted coffee, agitating, as by shaking, in an atmosphere containing oxygen in a receptacle provided with a manometer, and measuring the amount of oxygen absorbed through change in manometer level, i. e., manometrically. The Barcroft-Warburg — above mentioned — equipment and technique were found to yield comparable and correlative results. The flask volumes were about 35 cc., and the manometer liquid was Brodie's solution, i. e., 5.0 g. sodium tauroglycocholate
23.0 g. sodium chloride
5 drops of a saturated solution of thymol in 9% alcohol
500 cc. distilled water The acidity or pH value of the infusion influences the oxidation rate, and hence use was made of a buffered solution. A buffer found to give satisfactory results was Walpole's acetate solution containing 25.3 g. glacial acetic acid
215.0 g. sodium acetate ($NaC_2H_3O_2.3H_2O$)
10 liters of distilled water and having a pH value of about 5.20. This solution was used at a temperature of about 25° C., and the measurement of oxygen absorption was at a temperature of about 40° C. Factors entering into the determination are the rate of shaking, or manner of agitation of the infusion in the atmosphere containing oxygen; the ratio of coffee to buffer, which suitably may be about 1–10; the amount of 30% potassium hydroxide used in the inner cup of the Barcroft flask, and the temperature of measurement which should be controlled with accuracy.

As an illustrative embodiment of a manner in which the oxidizability of flavor imparting constituents of roasted coffee may be determined, the following description is presented. The temperature is adjusted suitably to about 40° C., and shaking effected at a rate of about 110 oscillations per minute with an amplitude of 2 cm. The rate of shaking and the amplitude should be and are sufficient to give a maximum rate of absorption at the given or chosen temperature. Oxidizability is arrived at by weighing a 0.5 gram sample of ground, dry, roasted coffee into a Barcroft flask, placing about 0.2 cc. of 30% potassium hydroxide in the inner cup of the flask, adding to the coffee about 5 cc. of Walpole's acetate buffer at a pH of about 5.2 and at a temperature of about 25° C., then attaching the flask to a manometer by means of a ground joint, and equilibrating the system at a temperature of about 40° C. for a period of about 20 minutes. There should be allowed a period of about 10 minutes for preparation and assembly of materials. Following the equilibration the system is sealed by turning a valve and the manometric measurements started. The apparatus utilized included seven manometers and flasks, one set of which was utilized as a thermal barometer. The coffee samples were taken in duplicate and measurement of three different lots was made simultaneously. Reading of the manometers or pressure was at intervals over a two to three hour period. A volume calibration permits of the calculation of corresponding oxygen absorptions, and the following calculation is given as illustrative:

Volume of flask and capillary=$V_T$=34.52 cc.
Volume of coffee infusion=$V_F$=5.37 cc.
Volume of potassium hydroxide=$V_K$=0.20 cc.
Volume of air space=$V_T-(V_F+V_K)=V_G$=28.95 cc.
Normal pressure in mm. of Brodie solution= $P_o$=10,037
Drop in pressure after two hours' reaction=$h$= 92.8 mm.
Solubility of oxygen at 40° C.=$\alpha$=0.023
Absolute temperature of bath =$T$=313.1°

Volume of oxygen absorbed=

$$V_o = \frac{h\left(V_G\frac{273.1}{T}+V_F\alpha\right)(1000)}{P_o} =$$

$$\frac{(92.8)\left[28.95\left(\frac{273.1}{313.1}\right)+5.37(0.023)\right](1000)}{10,037}=$$

234.6 cubic millimeters

Pressure to volume conversion factor=$K$=

$$\frac{\left(V_G\frac{273.1}{T}+V_F\alpha\right)(1000)}{P_o}=2.5276 \text{ for above system.}$$

The potassium hydroxide in the inner central cup of the Barcroft flask serves to remove the small amount of carbon dioxide which is evolved after the equilibrium period. This amount changes very slowly as the coffee ages, and hence the carbon monoxide which is simultaneously evolved and not absorbed, introduces at most only a very small error. It may be pointed out that the evolution of carbon dioxide is, as a rule, twenty times that of carbon monoxide. It should likewise be mentioned that in carrying out a determination, the control of temperature should be precise, i. e., to at least 0.05° C.

Further, it is highly desirable that the temperature during the preparative period, i. e., prior to equilibration, should be maintained substantially at a constant value. The buffer is introduced at about 25° C. and the flasks are kept at this temperature until equilibrated. Inasmuch as a given sample of coffee contains only a small amount of oxidizable material, it is desirable that temperature and other conditions be controlled with accuracy so that prior to actual determination each sample will have undergone the same oxidation. If conditions were otherwise, the relative absorption rates would not be representative of the amounts of oxidizable substances.

In the following tables there are presented data obtained from measurements of the oxidation of samples of coffee which had been stored under varying conditions. Sample A had been placed over distilled water at a 100% relative humidity; sample B had been stored over a saturated solution of calcium nitrate at an approximate 50% relative humidity; and sample C was stored over "Drierite" (anhydrous calcium sulfate) at substantially 0% relative humidity. The results contained in Table 1 below are of determinations made upon coffee after it had been stored at the humidities indicated for a period of ten days. In Table 2 the results are for periods which are considerably longer.

TABLE 1

*Oxygen absorbed in cubic millimeters*

| Sample No. | A | | | B | | | C | | |
|---|---|---|---|---|---|---|---|---|---|
| Relative humidity of storage chamber | 100 percent | | | 50 percent | | | 0 percent | | |
| Time in minutes | (1) | (2) | Mean | (1) | (2) | Mean | (1) | (2) | Mean |
| 10 | 24.0 | 24.1 | 24.1 | 42.8 | 46.1 | 44.4 | 55.4 | 56.7 | 56.1 |
| 20 | 47.8 | 48.0 | 47.9 | 84.8 | 89.3 | 87.1 | 102 | 101 | 102 |
| 30 | 68.5 | 68.1 | 68.3 | 115 | 120 | 118 | 138 | 137 | 138 |
| 40 | 87.6 | 88.6 | 88.1 | 148 | 152 | 150 | 173 | 170 | 172 |
| 50 | 104 | 105 | 105 | 170 | 174 | 172 | 197 | 196 | 197 |
| 60 | 121 | 122 | 122 | 195 | 199 | 197 | 225 | 223 | 224 |
| 75 | 140 | 140 | 140 | 221 | 226 | 224 | 255 | 254 | 255 |
| 90 | 160 | 161 | 161 | 249 | 256 | 253 | 288 | 287 | 288 |
| 105 | 181 | 183 | 182 | 279 | 286 | 284 | 318 | 315 | 317 |
| 120 | 195 | 197 | 196 | 299 | 306 | 303 | 345 | 341 | 343 |

TABLE 2

*Oxygen absorbed in two hours per 0.500 gram of coffee*

| Sample No. | A | B | C |
|---|---|---|---|
| Storage period, days | Cubic Millimeters | Cubic millimeters | Cubic millimeters |
| 0 | 350 | 352 | 360 |
| 1 | 342 | 349 | 355 |
| 4 | 297 | 323 | 348 |
| 7 | 249 | 311 | 346 |
| 10 | 196 | 303 | 343 |
| 18 | 111 | 289 | 332 |
| 24 | 77 | 280 | 328 |
| 31 | 52 | 275 | 323 |
| 49 | 21 | 261 | 320 |
| 82 | | 236 | 315 |

As a result of cup tests made on the above described samples, a distinctly stale flavor was detected in sample A after a period of three to four days, whereas sample B required seven to eight days before staleness became apparent, and sample C was only slightly stale after storage of a month. Moreover, the stale taste in sample A developed when the absorption rate had dropped approximately 100 cubic millimeters per gram per two hours; that in B when the rate had dropped about 80 cubic millimeters per gram; and with respect to sample C incipient staleness was not reached until the rate had decreased about 75 cubic millimeters per gram. These differences may, to some extent, be due to difficulty in estimating staleness by the cup test, but it is indicated that incipient staleness for the coffee utilized in the foregoing determinations developed when the absorption rate had decreased about 75 cubic millimeters per gram. Such decrease in absorption rate is considered to be due to oxidation, volatilization and even possibly to polymerization of flavor imparting substances. The drop in absorption corresponds to a rate decrease of about 35 cc. of oxygen per pound of coffee and is proportional to the amount of oxygen absorbed in reaching incipient staleness.

By utilization of the technique herein described the rate of absorption of oxygen by a given weight of roasted coffee may be measured, and thereby indicate the staleness of the coffee since the rate of oxygen absorption decreases as staleness develops. It appears therefrom that fresh roasted coffee contains an amount of oxidizable material which varies in accordance with the nature, character or manner of roast, and this material decreases slowly during air storage in view of reaction with atmospheric oxygen. The measured oxidizability or rate of oxygen absorption decreases during air storage and therefore may be correlated with loss in fresh coffee flavor at a given time, so that the extent to which staleness has developed may be determined. When such measurements are made with the utilization of dry coffee, it was found that variations in humidity caused rather decided fluctuations in the measured absorptions, and hence made the obtainment of definitive results difficult. This difficulty was found to be obviated by preparing a water infusion and determining the absorption of such infusion.

It will be realized that there are a number of factors involved in measuring the oxidation of a material having the complexity of the flavor imparting constituents of coffee. This is especially so when employing a manometric method. However, the results obtained in accordance with the foregoing procedure show that changes in the absorption rate of oxygen are directly proportional to the amount of oxidizable material present, and hence the measurements of rate really effect a determination of the total amount of change. Furthermore, the rate of oxygen absorption of coffee increases with the nature of the roast. This renders a comparison of different coffees somewhat difficult unless the character of the roast is known with some definiteness. The method described herein may be used also to evidence the character of the roast, since my findings are that the amount of oxidizable material in the coffee increases from a light to a dark roast, and substantially so to the point at which coffee is charred. Therefrom a determination of the nature of the roast may be made through a measurement of oxygen absorption, and thereby provide an accurate characterization of the roast which is considered to be more precise than estimation of color, either by eye or by means of optical instruments. Hence, the procedure hereinbefore given enables a worker in the art to estimate quantitatively the deterioration of a sample of roasted coffee by a combination of objective measurements, and also thereby to estimate the nature of the roast.

Since certain changes may be made in carrying out the above mentioned method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method for determining the character of coffee, which comprises determining the oxidizability of roasted coffee by contacting coffee with oxygen under controlled time, humidity and temperature conditions, and measuring the amount of oxygen absorbed.

2. A method for determining the character of coffee, which comprises preparing an infusion of coffee, contacting such infusion with oxygen under controlled time and temperature conditions, and measuring the amount of oxygen absorbed.

3. A method for determining the character of coffee, which comprises preparing an infusion of coffee, agitating said coffee infusion in an atmosphere containing oxygen under controlled time and temperature conditions, and measuring the amount of oxygen absorbed.

4. A method for determining the character of coffee, which comprises preparing an infusion of coffee in a buffer solution having a pH value of about 5.2 at a temperature of about 25° C., shaking said infusion in an atmosphere containing oxygen under time and temperature controlled conditions, and measuring the amount of oxygen absorbed manometrically.

5. A method for determining the character of coffee, which comprises preparing an aqueous infusion of coffee by treating coffee with an acetate buffered solution having a pH value of about 5.2, shaking said infusion at a rate of 110 oscillations per minute with an amplitude of two centimeters in an atmosphere containing oxygen at a temperature of about 40° C., removing evolved carbon dioxide by absorption in potassium hydroxide, equilibrating at such temperature for a period of about 20 minutes, and then measuring the amount of oxygen absorbed manometrically at a temperature of about 40° C.

WILLIAM REDMOND JOHNSTON.